US010166848B2

(12) United States Patent
Lewis et al.

(10) Patent No.: US 10,166,848 B2
(45) Date of Patent: Jan. 1, 2019

(54) LOCKING LIFT ASSIST FOR FOLDING SOFT TOPS

(71) Applicant: Bestop, Inc., Louisville, CO (US)

(72) Inventors: Stephen J. Lewis, Harrison Township, MI (US); Tavis Lutzka, Rochester Hills, MI (US)

(73) Assignee: Bestop, Inc., Louisville, CO (US)

( * ) Notice: Subject to any disclaimer, the term of this patent is extended or adjusted under 35 U.S.C. 154(b) by 0 days.

(21) Appl. No.: 15/354,663

(22) Filed: Nov. 17, 2016

(65) Prior Publication Data

US 2017/0136859 A1    May 18, 2017

Related U.S. Application Data

(60) Provisional application No. 62/256,482, filed on Nov. 17, 2015.

(51) Int. Cl.
*B60J 7/185* (2006.01)
*B60J 7/06* (2006.01)

(52) U.S. Cl.
CPC .............. *B60J 7/185* (2013.01); *B60J 7/061* (2013.01); *B60J 7/062* (2013.01)

(58) Field of Classification Search
CPC ............ B60J 7/185; B60J 7/062; B60J 7/061
USPC .................................................. 296/110, 122
See application file for complete search history.

(56) References Cited

U.S. PATENT DOCUMENTS 6,295,713 B1 * 10/2001 Hilliard .................. B60J 7/1226
29/446
6,409,247 B1  6/2002 Maass
9,346,342 B1  5/2016 Bowles
2001/0030443 A1  10/2001 Barker
2004/0108747 A1  6/2004 Obendiek
2012/0098292 A1  4/2012 Huotari et al.
2012/0286540 A1  11/2012 Moran et al.
2014/0339851 A1 * 11/2014 Bennett .................. B60J 7/1226
296/122

FOREIGN PATENT DOCUMENTS

| BE | 350963 A | 4/1928 |
| DE | 10102643 A1 | 7/2002 |
| GB | 311081 A | 5/1929 |
| GB | 336514 A | 10/1930 |
| WO | 2004056596 A2 | 7/2004 |

OTHER PUBLICATIONS

International Search Report for Application No. PCT/US2015/022716, dated Jun. 12, 2015.

* cited by examiner

*Primary Examiner* — Joseph D. Pape
*Assistant Examiner* — Dana D Ivey
(74) *Attorney, Agent, or Firm* — Warn Partners, P.C.

(57) ABSTRACT

A soft top assembly which includes lift assist with improved fabric management and a lift assist locking mechanism. The soft top is rotatable between a closed, open sunroof position, and open position. When a cam of the lift assist locking mechanism is in a locked position, the soft top is prevented from moving from the open sunroof position to the open position. When a release mechanism of the lift assist is actuated, the cam is moved to an unlocked position allowing the soft top to be moved rearward into the open position. A handle lockout of the lift assist locking mechanism selectively positions a cam lockout to prevent the soft top from moving/rotating back to the open sunroof position.

19 Claims, 11 Drawing Sheets

LOCKING LIFT ASSIST FOR FOLDING SOFT TOPS

CROSS REFERENCE TO RELATED APPLICATIONS

This application claims the benefit of U.S. Provisional Application No. 62/256,482, filed Nov. 17, 2015. The disclosures of the above application are incorporated herein by reference.

FIELD OF THE INVENTION

The present invention relates to a dual purpose lift assist mechanism for foldable/stowable soft tops for vehicles.

BACKGROUND OF THE INVENTION

Foldable soft tops for SUV vehicles are known in the art. These tops provide a vehicle with an open air experience with the top folded back or provide protection from the elements with the top folded forward. Such tops are typically manually retractable and during retraction the operator has to perform a series of manipulation of the top. Additionally, manual management and stowage of the fabric materials of the top during folding must be accomplished.

Thus, in order for a vehicle operator to facilitate opening of the soft top in order to provide the open air vehicle feeling the operator must be outside the vehicle to manipulate the soft top. Therefore, in recent years a soft top "sunroof" has become a well-received option for folding SUV soft tops. This "sunroof" typically folds back from within the vehicle such that the operator can readily provide an open air experience without folding back the entire soft top. An example of such a soft top is the Sunrider™ soft top by Bestop, the assignee herein which provides a front "sunroof" portion of the top which folds back for revealing an open air sunroof feeling for the vehicle.

While this sunroof option has become a very desirable feature, it does require considerable force at the start of the deployment due to the operator's angle of attack. The mass of the frame mechanism for folding the top cover fabric and fabric becoming trapped in the frame mechanism linkage are additional concerns. Also, fabric management is occasionally problematic in that the fabric can become entangled or interfere with the frame mechanism of the top.

Another problem is that current systems do not latch the soft tops in the open position at all and/or do not quickly and effectively lock the soft tops in the open sunroof position.

Therefore, there remains a need in the art to provide a sunroof deployment mechanism that provides easier opening and improved fabric management in combination with a lift assist that locks the soft top in the open position and also allows the soft top to be rotated into a stowed position and held in the stowed position and/or selectively removed from the vehicle.

SUMMARY OF THE INVENTION

In accordance with the present invention, there is provided a frame and soft top assembly which includes lift assist and improved fabric management. The assembly includes a pair of front side arms pivotally attached to rear side rails. The rear side rails are attached to the vehicle roll bar. A plurality of control bows are operably connected with pivot links to provide fabric control to the top material during pivoting of the front side rails. A pair of the bow pivot links being pivotally connected to the rear side rail. A rear gas strut and a front gas strut are attached longitudinally to either side of the said pair of bow pivot links such that one is closed and preloaded when the sunroof is in its closed position and upon opening the sunroof the preloaded strut provides lift assistance at the start of the pivotal opening of the sunroof the other of the struts gets loaded as the top is deployed and buffers the closing of the roof which also loads the strut to provide assistance in the closing direction when it is time to close the sunroof. Extra lateral bows are provided which provide management of the fabric thereby keeping the fabric out of the mechanism during opening and closing of the sunroof.

The lift assist is also operably moveable from the open "sunroof" position to a down (or stowed) position to provide a fully open roof feel. Both sides of the lift assist is operably slidably coupled, and/or rotatably coupled, to a respective channel, or other suitable structure, operable to slide or otherwise move the lift assist rearward and/or generally downward to a stowed position generally adjacent the tailgate area of the vehicle.

A lift assist locking mechanism is provided, that is preferably a rearward mounted mechanism, for selectively locking the soft top in position when in at least the open position. The lift assist locking mechanism is lockable to hold the soft top in the open sunroof position. The locking mechanism is selectively releasable by an operator when desired to allow the soft top to be rotated or otherwise operably moved from an open sunroof position into the down position (or "stowed" position). A cam lockout prevents the soft top from rotating back to the open sunroof position. When in the down position and locked, the soft top is selectively removable from the vehicle when desired.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
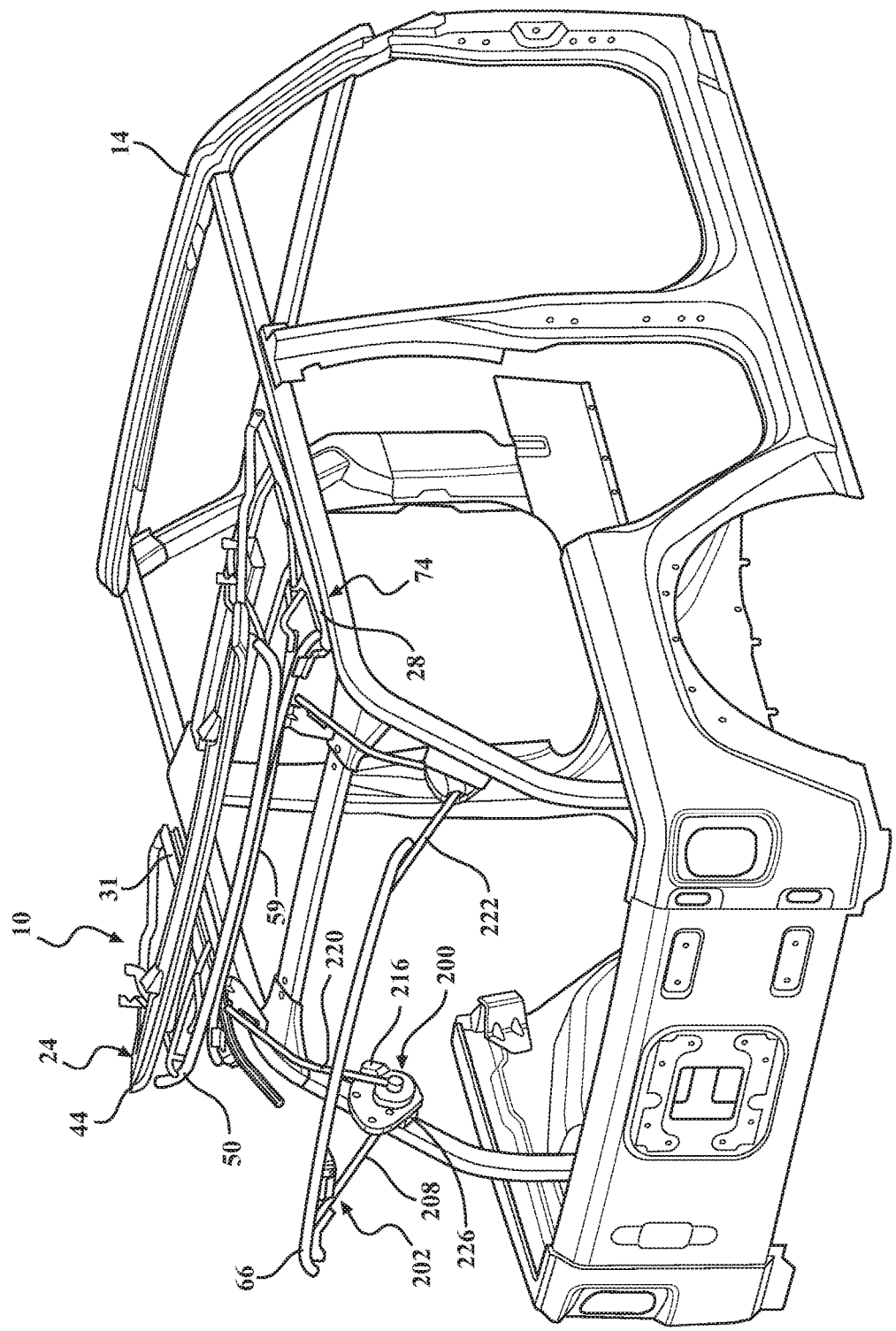
FIG. 1 is a rear perspective view of a soft top assembly with lift assist and a lift assist locking mechanism, shown with the soft top folded back to an open sunroof position, according to the present invention.
Figure 2:
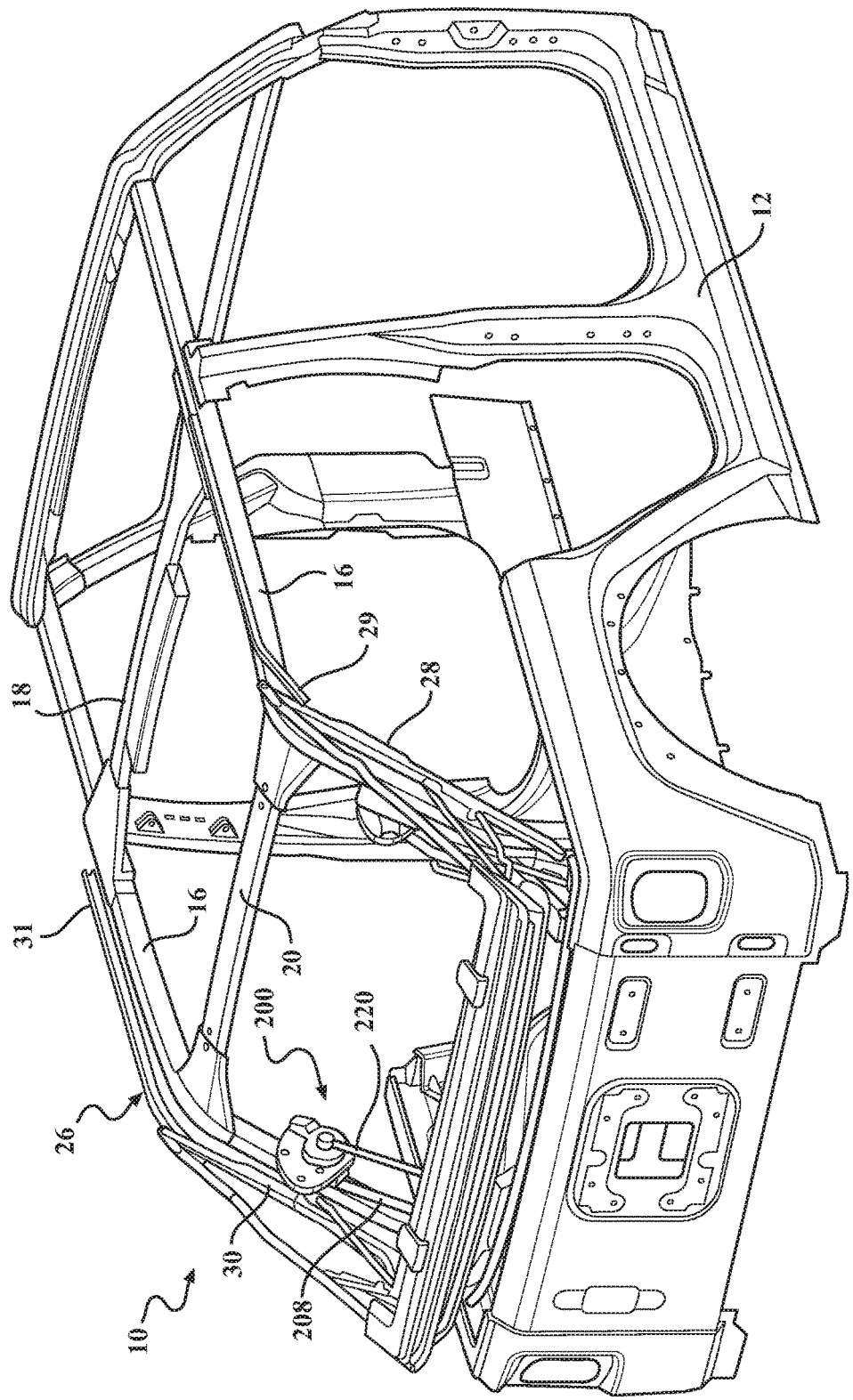
FIG. 2 is a rear perspective view of the sunroof type soft top assembly shown with the soft top in a down fully open position, according to the present invention.

Referring to the Figures generally, in accordance with the present invention, there is provided a soft top assembly generally shown at 10 for a vehicle 12. The soft top assembly 10 is utilized with four-door sport-utility vehicles, however, is operably adaptable for two-door sport-utility vehicles, hatchback, crossover, hybrids, or any other vehicle of any kind depending on the application without departing from the scope of the present invention. Referring more particularly to FIGS. 1-2, there is illustrated the vehicle 12 generally including a windshield frame 14 with a pair of side members 16 (or vehicle "roll bars") extending generally therefrom, a first crossmember 18 operably connected to the side members 16 generally adjacent the rear of the cockpit compartment 22, and a rear crossmember 20 operably connected to side members 16 generally toward the rear of the vehicle 22.

The assembly 10 has a pivotal sunroof portion generally indicated at 24, operably rotatable between a closed position and an open position (e.g., FIG. 1 open position or "sunroof position"), and a fixed portion generally indicated at 26 operable connected to the side members 16 or other suitable vehicle structure. The assembly 10 has a plurality of bows, preferably, at least a first bow 44, at least one intermediate bow 50 and/or at least one fabric assist bow 59,60, a first rear bow 66 and at least one rear bow 66. The first bow 44 is operably connected to a cover 72, e.g., soft top fabric cover, and selectively connected to the windshield frame for opening/closing the sunroof portion 24 of the assembly 10. When an open air sunroof feel is desired for the cockpit, the pivotal sunroof portion 24 is folded/rotated back to the sunroof position. When desired the pivotal sunroof portion 24 is rotated to the closed position and connected to the vehicle sealing off the cockpit opening.

In one embodiment a lift assist mechanism generally indicated at 74 is provided that allows assisted opening and closing of the pivotal sunroof portion 24 while the operator is in the vehicle 12. In a preferred embodiment, the lift assist mechanism 74 includes at least one of each of a first gas cylinder 76 and second gas cylinder 78 or "strut" including respective first 84 and second 82 actuation shafts received in first 84 and second 86 compressed air assist type pneumatic cylinder bodies. The gas struts 76,78 which are connected in force opposition between a fourth fabric assist linkage 70 and the side rail 28 such that one of the gas cylinders, e.g., first cylinder 76, is compressed when the sunroof is down and the other of the gas cylinders, e.g., second cylinder 78, is extended. When the pivotal sunroof portion 24 is opened the force in the compressed gas cylinder 76 applies force to a linkage 70 assisting the sunroof in an opening direction. As the pivotal sunroof portion 24 is opening the other cylinder 78 is being compressed and upon closing the pivotal sunroof portion 24 the now compressed cylinder 78 provides force assistance for closing the pivotal sunroof portion 24. This allows assisted opening and closing of the pivotal sunroof portion 24 while the operator is in the vehicle 12.

Figure 7:
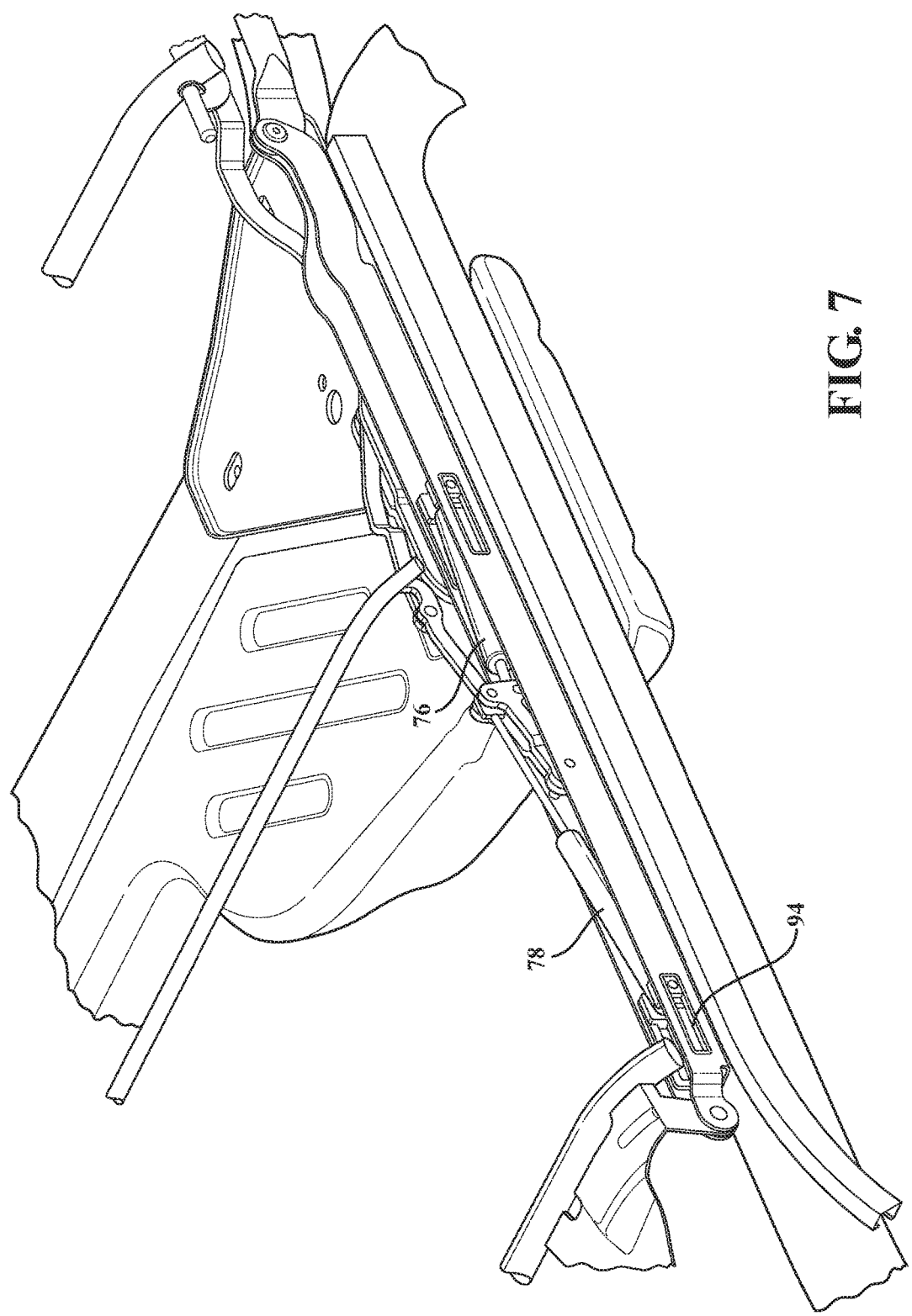
FIG. 7 is a detailed perspective view of a lift assist mechanism of the soft top assembly in a closed position, according to an embodiment of the present invention.
Figure 8:
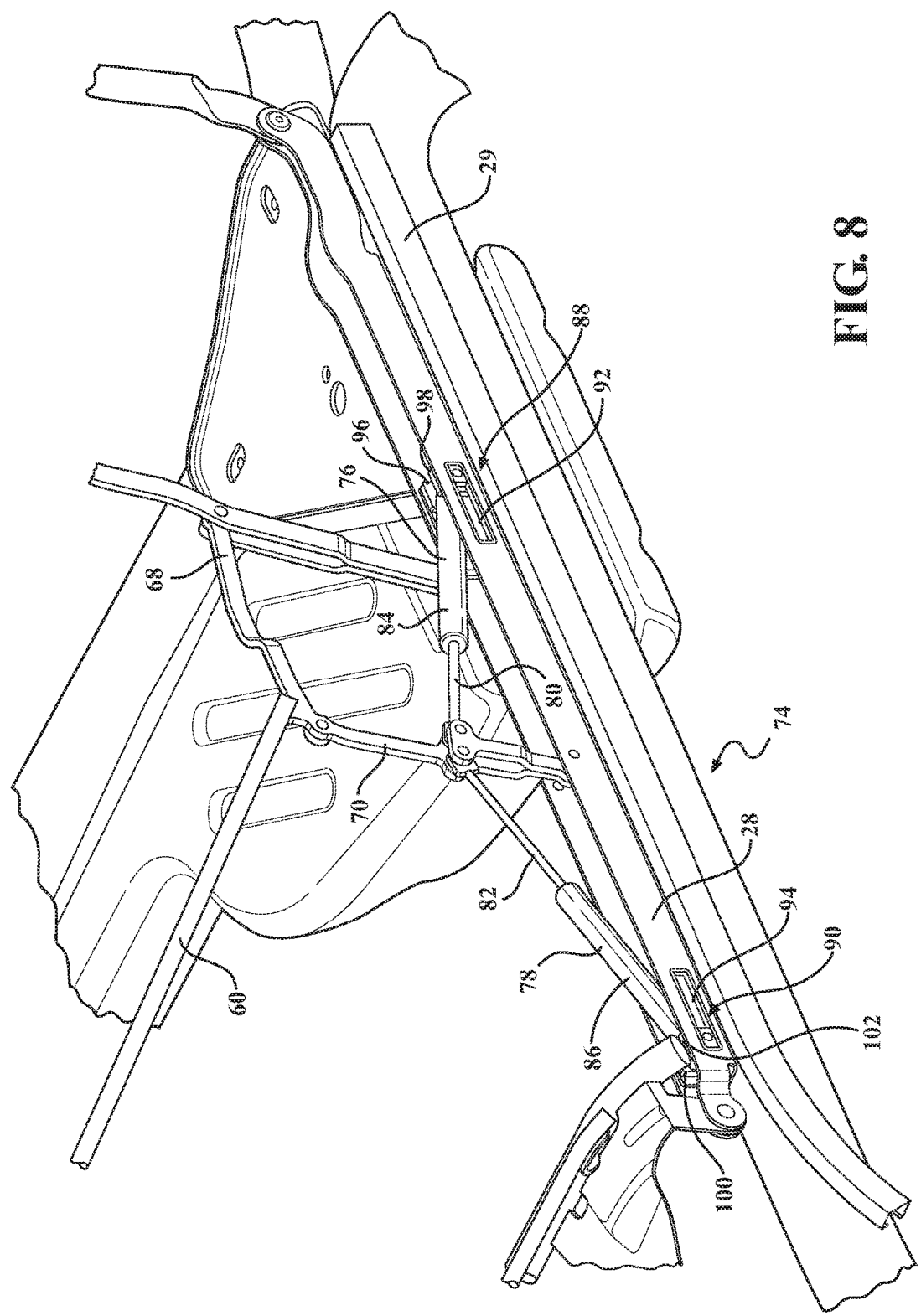
FIG. 8 is a detailed perspective view of the lift assist mechanism of the soft top assembly of the present invention in the opening or closing positions.
Figure 9:
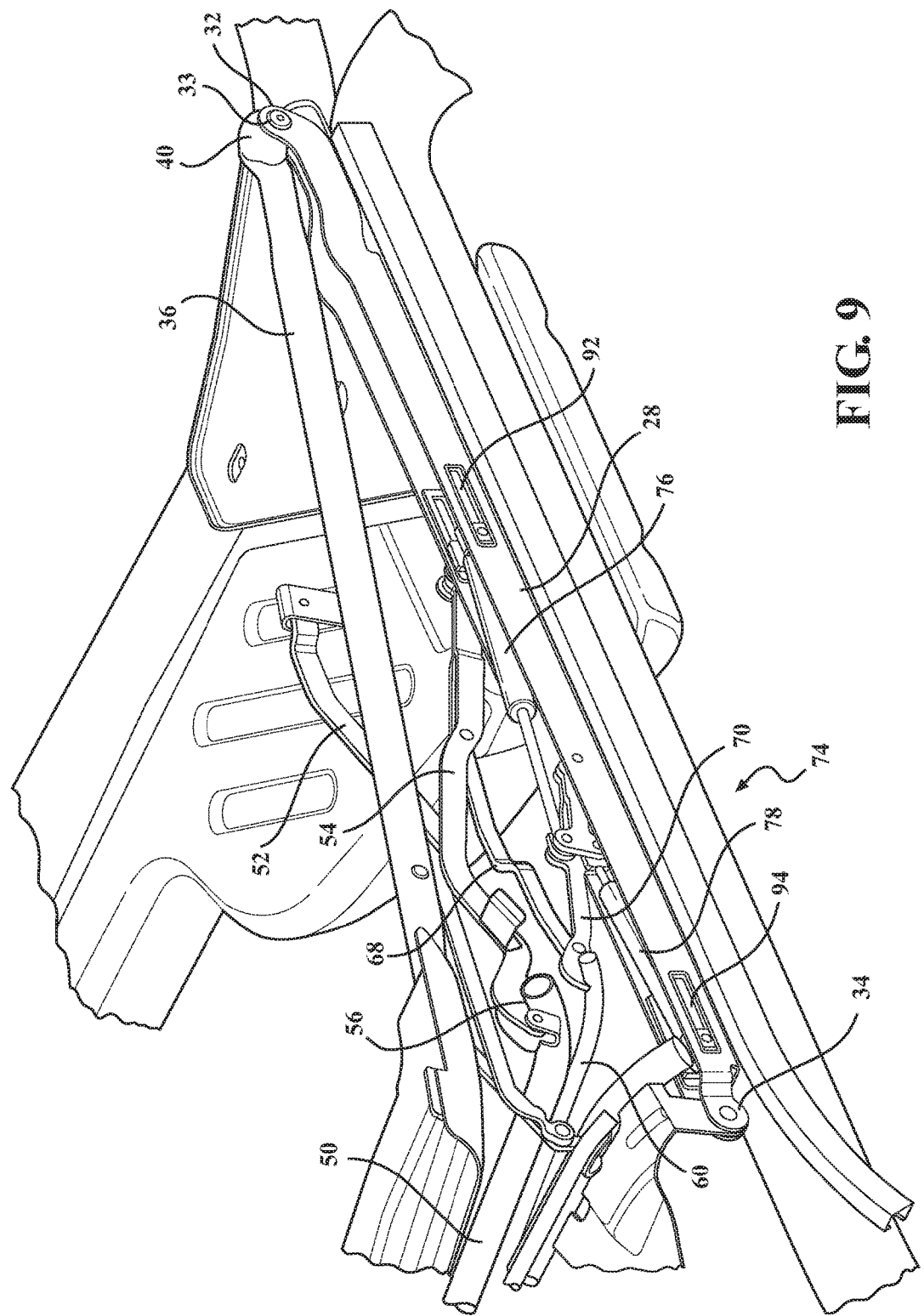
FIG. 9 is a detailed perspective view of the lift assist mechanism of the soft top assembly of the present invention in the middle of the sunroof in the open position.
Figure 10:
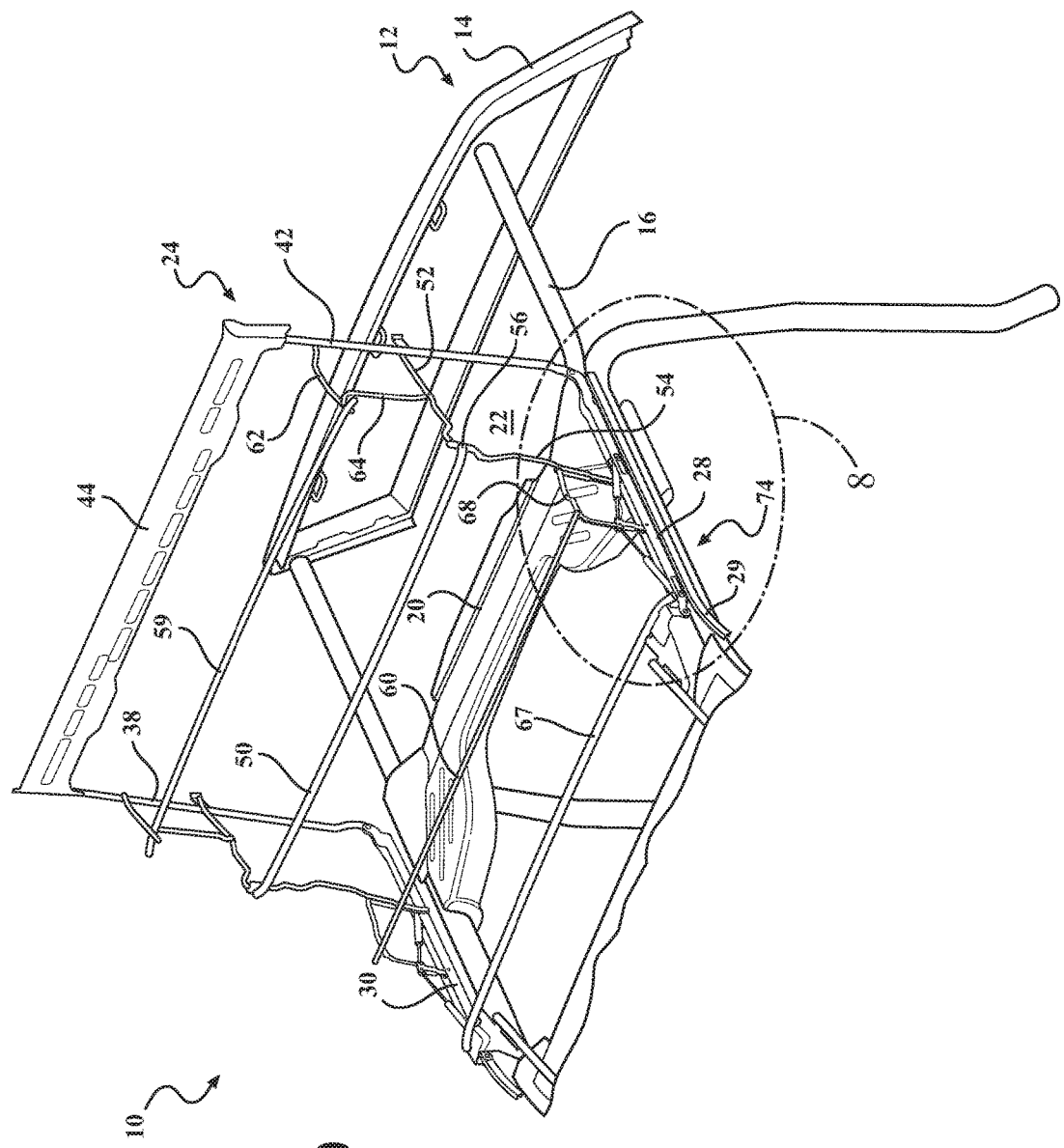
FIG. 10 is a perspective view of the soft top assembly, according to the present invention; and, FIG. 11 is a perspective view of the soft top assembly of the present invention illustrating improved fabric management.

The cylinders 76,78 are attached to the side rails 28,30 by way of lost motion arrangements 88,90. Preferably, the side rails 28,30 are 'U'-shaped. The lost motion arrangements 88,90 include slots 92 and 94 on either side of the U-shaped channel at each location. Bushing members 96,98 and 100,102 are provided to slide in the slots 92,94. The cylinders 76,78 are connected between these bushing members 92,94 and 100,102, respectively. This provides lost motion during the initial opening and closing actions of the pivotal sunroof portion 24. Referring now to FIG. 9, with the pivotal sunroof portion 24 fully open the cylinder 78 is fully compressed and the first cylinder 76 is fully extended and has been pulled to the left side of the lost motion slot 92. As the top is closed (or opened) the cylinders are forced to opposite sides of the lost motion slots 92,94 such that one cylinder provides dampening and the other provides assist force. With the sunroof top closed one cylinder is fully extended and pulled to the right side of the lost motion slot as illustrated in FIG. 8. In the sunroof top closed position, the other cylinder is compressed for providing assist during opening as illustrated in FIG. 7.

In addition, the side rails 28,30 are operably connected to respective frame members 29,31 or "tracks" of the fixed portion 26 and/or other suitable structure with a plurality of fasteners. At least one bracket or at least one molded door rail or the like suitable structures could also be used to connect the tracks to the vehicle sport bar or other suitable vehicle structure. The frame members 29,31 are generally shaped as 'C'-channels or 'U'-channels. The side rails 28,30 are operably coupled to slidably move rearward and rotate generally downward or otherwise move to the down position. In a preferred embodiment, the side rails 28,30 are operably slidably coupled to the C-channel to slide the side rails 28,30 generally rearward alone the tracks when desired. In this embodiment, at least one bracket 228 with at least one sliding member 230 or roller (see FIG. 3A) is provided on the side rails 28,30, e.g., preferably connected thereto with at least one fastener. Preferably, at least two slide members 230 are provided, one toward the front and one toward the rear of each side rail 28,30. The sliding member 230 is received in the channel of the frame members 29,31, respectively, for sliding the pivotal sunroof portion 24 in the fore and aft direction.

Figure 3A:
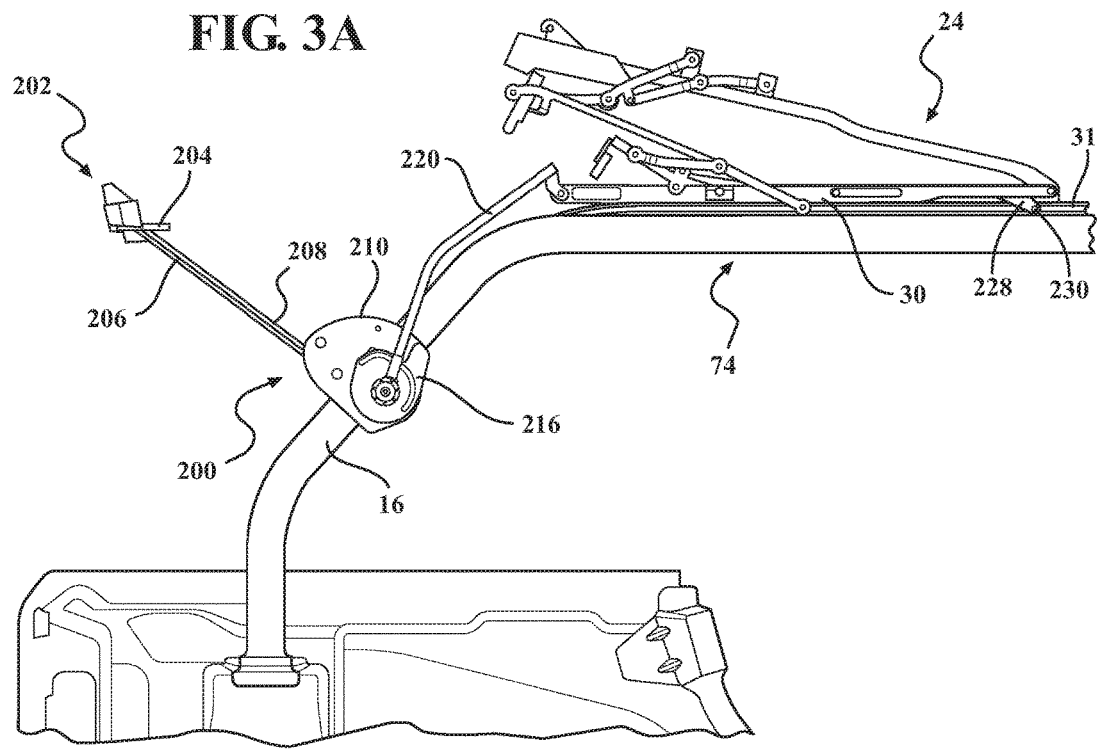
FIG. 3A is an enlarged side elevation cross sectional view taken from FIG. 1.

FIGS. 1 and 3A illustrates the pivotal sunroof portion 24 in the open sunroof position. FIGS. 2 and 6A illustrates the soft top assembly 10, including the pivotal sunroof portion 24, in the down fully open position. However, it is understood that after the assembly 10 is in the fully open position and locked, as will be explained further below, an operator can selectively remove the top from the vehicle, according to an embodiment of the present invention.

In a most preferred embodiment the assembly 10 is additionally provided with at least one lift assist locking mechanism generally indicated at 200. The lift assist mechanism 74 provides assisted opening and closing of the pivotal sunroof portion 24 in combination with the lift assist locking mechanism 200 serving the dual purpose of holding the sunroof in the folded open position and allowing the soft top in the sunroof position to be rotated into the down position, and/or, where the soft top can then be removed from the vehicle if desired.

Referring more particularly to FIGS. 3A-6B, the lift assist locking mechanism 200 includes at least one release mechanism indicated generally at 202, preferably only one, with a release handle 204. The release mechanism 202 is shown connected to the rear bow 66. However, any other locations on the assembly 10 and/or vehicle 12 are contemplated that are suitable for an operator to grasp/actuate without departing from the scope of the present invention. The lift assist locking mechanism 200 further includes at least one cable 206, at least one housing 210, at least one cam 212, at least one cam lockout 214, at least one handle lockout 216 and at least one rotatable member 219 with a surface that engages the cam 212.

The release handle 202 is operably connected to at least one cable 206 to rotate the cam 212 between a locking and unlocking position. The cable 206 runs along the outside of at least one first arm member 208, e.g., tubular-like member, or within the arm member 208 or other suitable structure and is operably connected to the cam 212. In a preferred embodiment, the cable 206 is operably coupled toward one end 212a of a cam 212, wherein manipulating the release handle 204 moves the cable 206, which in turn moves the end 212a. The arm member 208 is operably connected to the rear bow 66 at one end. The other end of the arm member is rotatably connected to a housing 210 of the lift assist locking mechanism 200.

On one side, the housing 210 is operably connected to the sport bar 16 or other suitable vehicle structure toward the rearward cargo area of the vehicle 12. Preferably, at least one bracket 226 is provided to connect the housing 210 to the sport bar. The handle lockout 216 is rotatably connected to the other side of the housing 210. The cam 212, cam lockout 214 and rotatable member 219 are rotatably mounted within the housing 210 each by at least one fastener.

One end of a second arm member 220, tubular-like member, is rotatably connected to the lift assist locking mechanism 200 and the other end is operably connected to a bow of the assembly 10, preferably to the first rear bow 67. In a most preferred embodiment, the second arm member 220 is operably connected to the rotatable member 219 such that rotation of the second member 220 causes the rotatable member 219 to rotate.

In one embodiment, another arm member 222 is operably coupled to a bow of the assembly 10, preferably to the first rear bow 67, and is rotatably coupled to a plate or bracket operably connected to the other sport bar 16. The arm member 222 freely rotates when the second member 220 rotates between the up and down position. Alternatively, a second lift assist locking mechanism 200 is provided and operably connected to the other arm member 222. In another embodiment, the right side is a mirror image of the left side, and, pulling the single release handle 204 causes one or more cables 206 to pull the cam 212 in both locking mechanisms 200,200 to an unlocked position.

The cam lockout 214 includes at least one guide pin 214a that extends into an elongated curved aperture 224 formed in the handle lockout 216. The handle lockout 216 is selectively operably rotated, preferably manually by an operator when desired, which necessarily rotates the aperture 224 formed therein. Thus, as the handle lockout 216 rotates in either direction, the guide pin 214a of the cam lockout 214 is carried in the aperture 224, which causes the cam lockout 214 to also rotate between a first and second position, e.g., locked and unlocked positions.

Figure 3B:
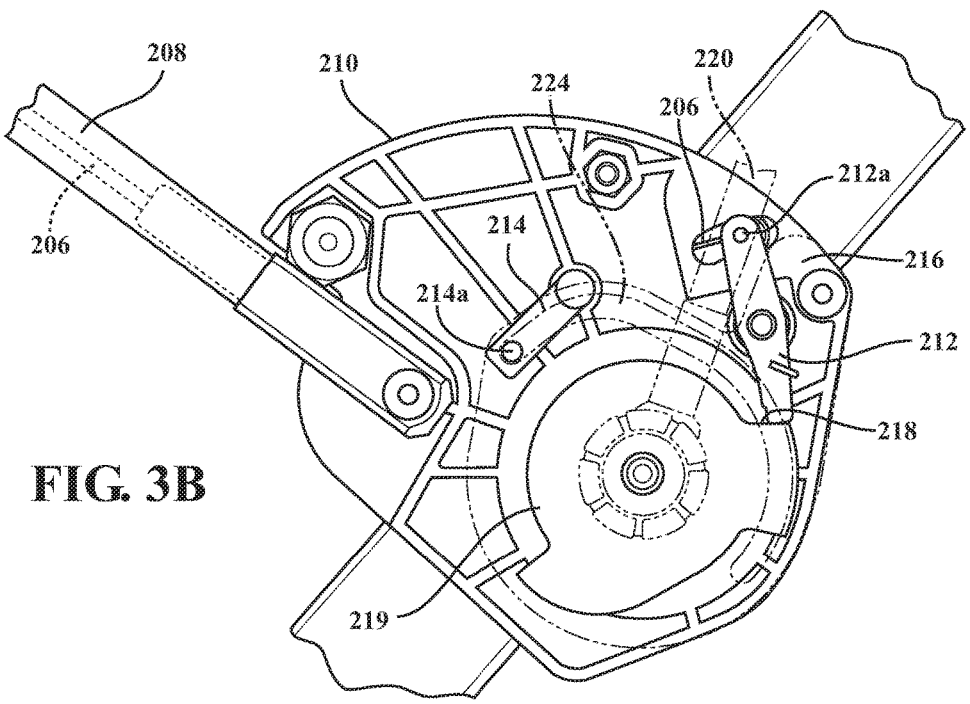
FIG. 3B is an enlarged side elevation view of the lift assist locking mechanism of FIG. 3A with portions in phantom to illustrate a cam locked to hold the soft top in the open sunroof position.

Referring more particularly to FIGS. 3A-3B, in operation, once the lift assist mechanism 74 has allowed the assisted movement of the soft top assembly 10 to the open (sunroof) position, the lift assist locking mechanism 200 selectively prevents the soft top from opening further. As shown in FIGS. 3A and 3B, the second member 220 is in a generally upward position and the cam 212 engages an opposing feature to lock the soft top in position. In a preferred embodiment, one distal end 212b of the cam 212 (opposite the end 212a that is connected to the cable 206) abuts against a protruding surface 218 on the rotatable member 219 thereby locking the soft top in position. The handle lockout 216 is in a first position and the cam lockout pin 214a is in the first end of the aperture 224. Since the cam 212 is preventing rotation of the rotatable member 219, the second member 220 is operably locked in place preventing the assembly 10 from moving further rearward and into the down position. In an embodiment of the present invention the cam 212 is a spring-loaded cam into engagement with the protruding surface 218.

Figure 4A:
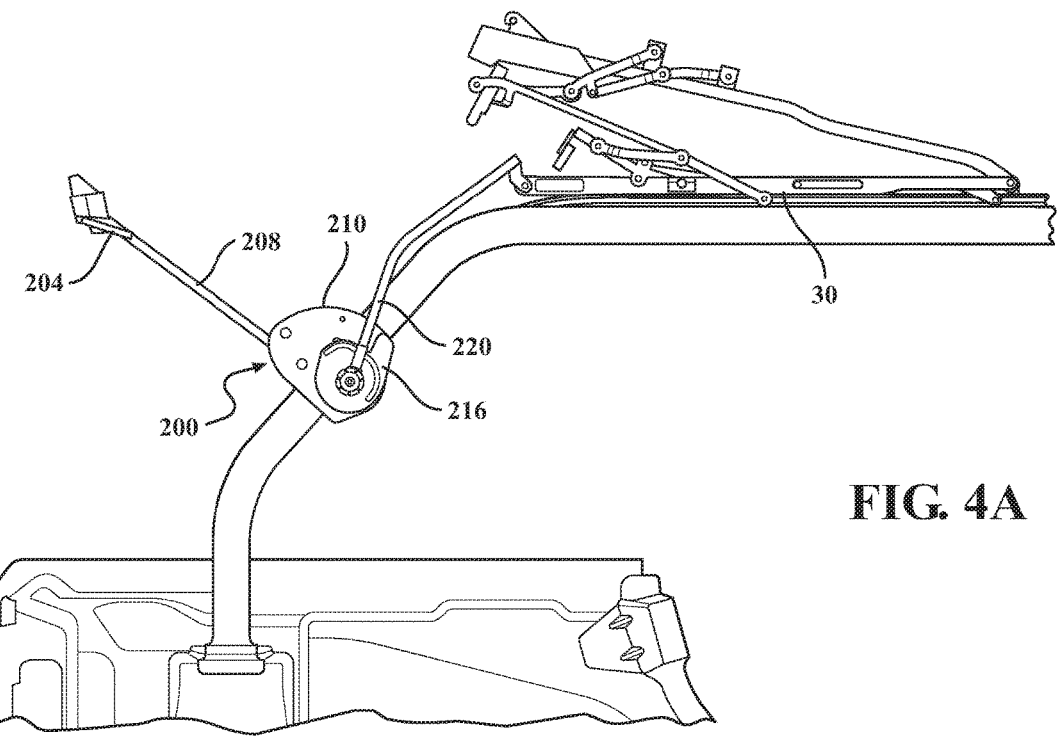
FIG. 4A is a side elevation of FIG. 3A, but with a release handle pulled, according to the present invention.
Figure 4B:
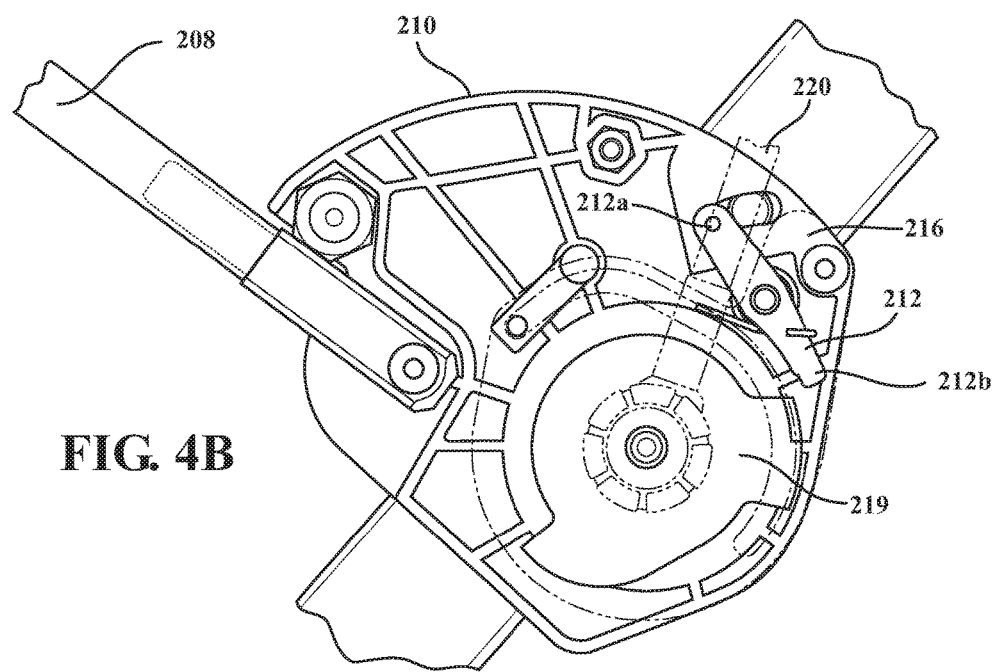
FIG. 4B is an enlarged side elevation view of the lift assist locking mechanism of FIG. 4A with portions in phantom to illustrate a cam unlocked to an open position when the release handle was pulled, according to the present invention.
Figure 5A:
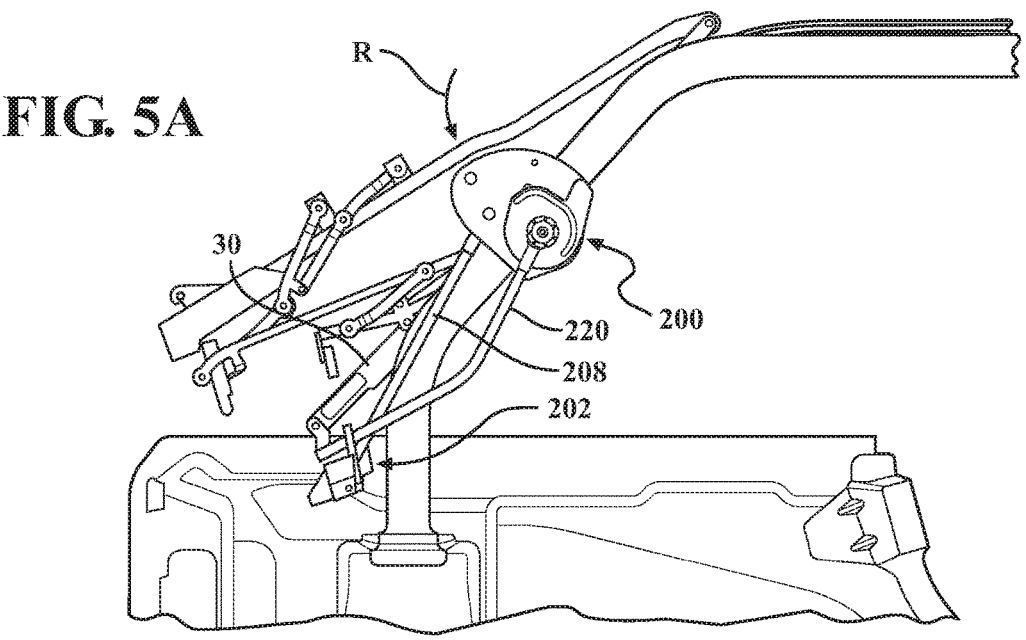
FIG. 5A is an enlarged side elevation cross sectional view taken of FIG. 2 including the lift assist locking mechanism with a handle lockout in a first position, according to the present invention.
Figure 5B:
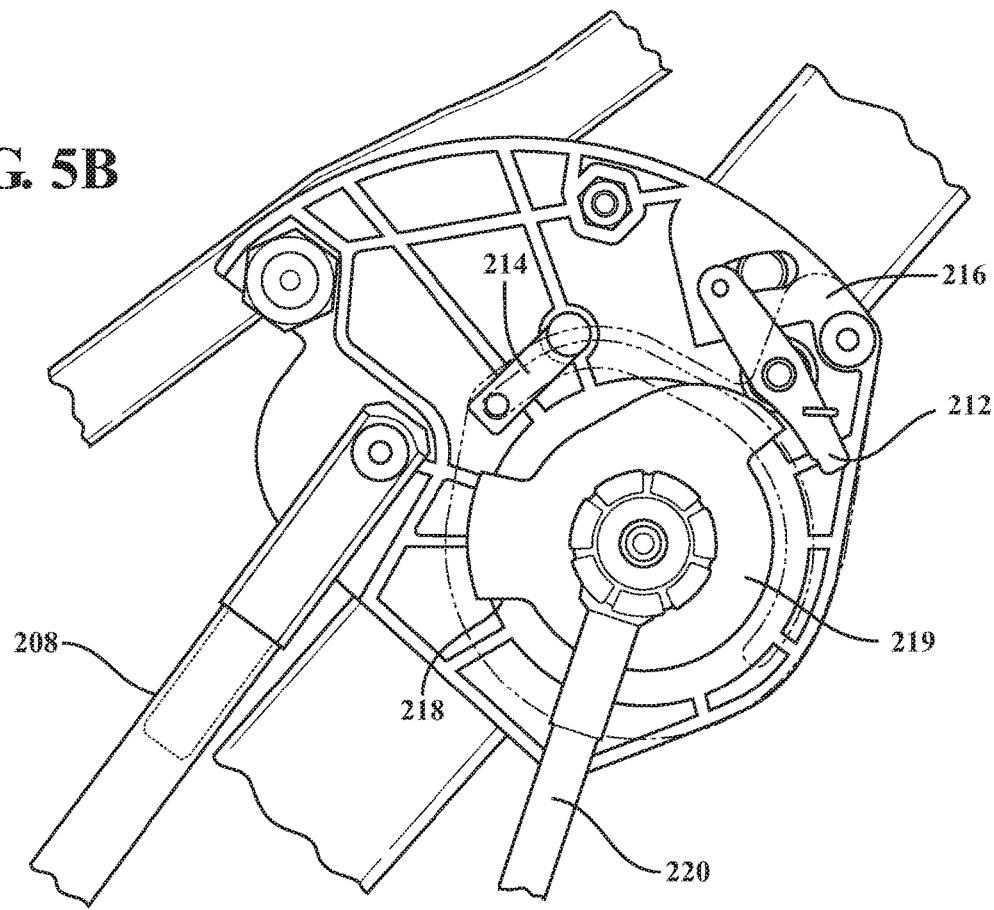
FIG. 5B is an enlarged side elevation view of the lift assist locking mechanism of FIG. 5A with portions in phantom to illustrate the cam unlocked and the soft top assembly rotated to the down fully open position, according to the present invention.

Referring now to FIGS. 4A-4B generally, when the release handle 204 is pulled (see FIG. 4A) this causes the cable 206 to pull the segment 212a of the cam 212, which necessarily rotates the distal end 212b of the cam 212 away from the protruding surface 218 until the cam 212 is in an unlocked position. FIG. 4B shows the cam 212 rotated to the unlocked position. FIG. 4B also shows the handle lockout 216 in the same position as shown in FIG. 3B; therefore, the cam lockout 214 has also not changed position. The second member 220 is also in the same upward position as FIG. 3B Referring now to FIGS. 5A-5B generally, there is depicted the soft top assembly 10 in the down fully open position. With the cam 212 in the unlocked position as shown, an operator was then able to rotate the second member 220 to the generally downward position as shown (and as indicated by rotational arrow "R" in FIG. 5A), which causes corresponding rotation of the rotatable member 219. The protruding surface 218 is thereby rotated away from the cam 212b. FIG. 5B also shows the handle lockout 216 in the same position as shown in FIGS. 3B and 4B; therefore, the cam lockout 214 has also not changed position.

Figure 6B:
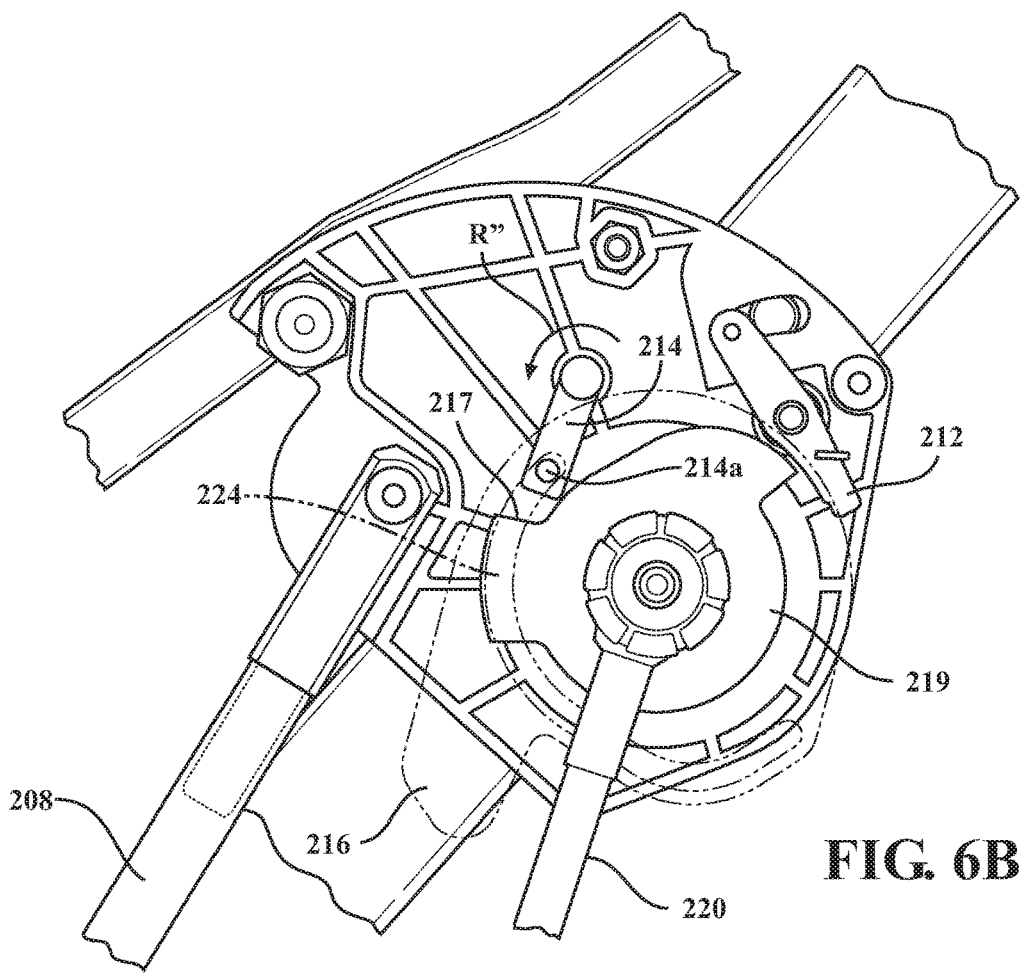
FIG. 6B is an enlarged side elevation view of the lift assist locking mechanism of FIG. 6A with portions in phantom to illustrate a cam lockout locked with the soft top in the down fully open position, according to the present invention.
Figure 6A:
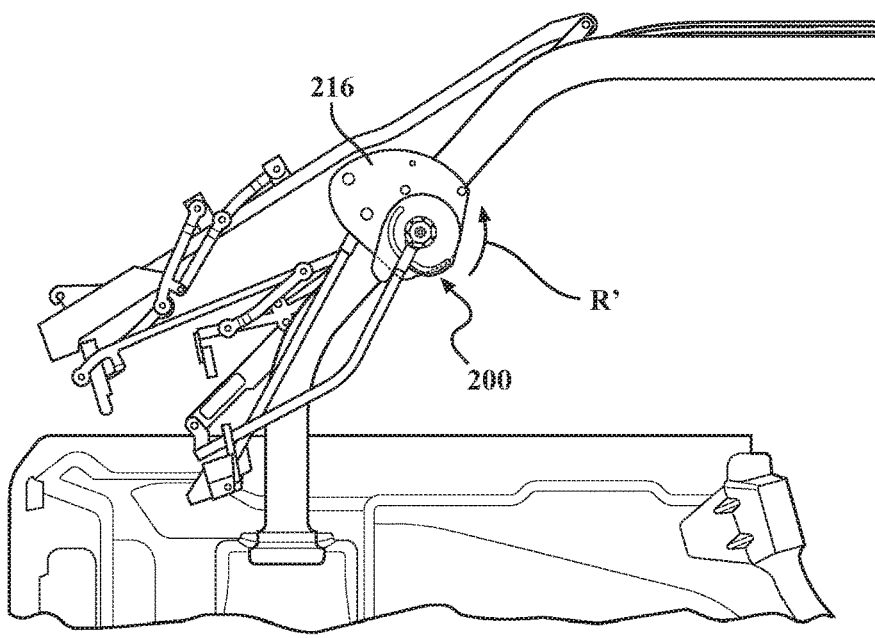
FIG. 6A an enlarged side elevation cross sectional view taken of FIG. 2, including the lift assist locking mechanism with the handle lockout rotated to a locking position, according to the present invention.

Referring now to FIGS. 6A-6B generally, there is depicted the soft top assembly 10 in the down fully open position. However, in addition, the handle lockout 216 is rotated as shown (and as indicated by rotational arrow "R'") to position the cam lockout 214. The handle lockout 216 is rotated until the pin 214a of the cam lockout 214 is against the other end of the aperture 224 of the handle lockout 216, which causes the cam lockout 214 to rotate to a second position as shown (and as indicated by arrow "R''''" in FIG. 6B) (. of the cam lockout 214 slides rotation of the handle 216 (indicated by arrow "R'''") allows rotation of the cam lockout 214 (indicated by arrow "R''''"). This positioning of the pin 214a with respect to the aperture 224 can effectively lock the cam lockout 214 in place and/or the pin end of the cam lockout 214 engages the rotatable member 219, e.g., against protruding surface 217, to lock the cam lockout 214 in place. The cam lockout 214 stops the soft top 10 from moving/rotating back to the sunroof position. In addition, when the folded top is locked the soft top can be removed from the vehicle by an operator. When moving the assembly 10 back to the sunroof position is desired, the operator turns the handle lockout 216 back which moves the cam locket 214 to allow rotation of the second arm member 220 to the upward position.

In one embodiment, the cam lockout is a spring loaded tang that automatically engages the lockout cam, or, alternatively, is a manually engaged tang actuated by the user and/or actuated with the cable 206 from the latch. In another embodiment, the lift assist locking mechanism is a spring lift assist assembly incorporating a coil spring arrangement.

Referring further to FIGS. 7-11 generally, the assembly 10 includes at least one linkage assembly for movement of the top in combination with fabric management of the cover 72, according to an embodiment of the present invention. The sunroof portion 24 is pivoted where at least one joint with the side rail 28, preferably, at least two joints. Each side rail 28, 30 includes a first end 32 and a second end 34.

A pair of pivot arms 36, 38 are pivotally connected at a first end 40 to the first end 32 of the side rails 28, 30 by way of a pin 33 going through diverging side walls of the 'U' shaped side rails 28, 30 and are connected at the other end 42 of the pivot arms to a first bow member or front bow 44. The bow member 44 is adapted for releasable attachment to the windshield frame for opening and closing the sunroof portion 24 of the assembly 10. Such attachments are known and are typically a hand actuated clamping arrangement or the like which may be secured for closure of the top and readily released for opening of the sunroof portion. A first rear bow member 67 is connected to the side rails 28,30 toward the second end 34. Also provided is at least one articulated intermediate bow member 50. At least one, preferably at least two, fabric assist bows are provided on the pivotal sunroof portion 24 and operably listed to the cover 72 for managing the cover material during opening/closing.

The intermediate bow member 50 is articulatingly connected between the side rail 28 and the pivot arm 36 via a linkage assembly including at least a first linkage arm 52 and second linkage arm 54. One of the linkage arms 52 being connected to the pivot arm 36 and a peripheral end 56 of the intermediate bow 50 and the other of the linkage arms 54 being connected to the side rail 28. The intermediate bow member 50 lies substantially flat in the sunroof closed position and the linkage arms 52,54 extend the member 50 outward during opening of the pivotal sunroof portion 24.

At least one first fabric assist bow members 59 and/or second fabric assist bow members 60 are provided. The first fabric assist bow member 59 is articulatingly connected for deployment in a position between the intermediate bow 50 and the front bow 44. The bow 59 is connected by way of a linkage assembly including at least one first bow assist linkage 62 pivotally attached to the pivot arm 36 and at least one second bow assist linkage 64 attached to the linkage arms 52 of the intermediate bow 50.

The second fabric assist bow 60 is articulatingly connected for deployment between the intermediate bow member 50 and the rear bow member 66. The second fabric assist bow 60 is connected by way of a linkage assembly including at least one third pivotal fabric assist linkage 68 and at least one fourth fabric assist linkage 70. The third fabric assist linkage 68 being connected to the linkage arm 54 connected to the intermediate member 50 and side rail 28. The fourth fabric assist linkage 70 is pivotally connected to the side rail 28.

More or less fabric assist bows, and corresponding linkage assembly arrangements, are contemplated depending on the application without departure from the scope of the present invention.

Figure 11:
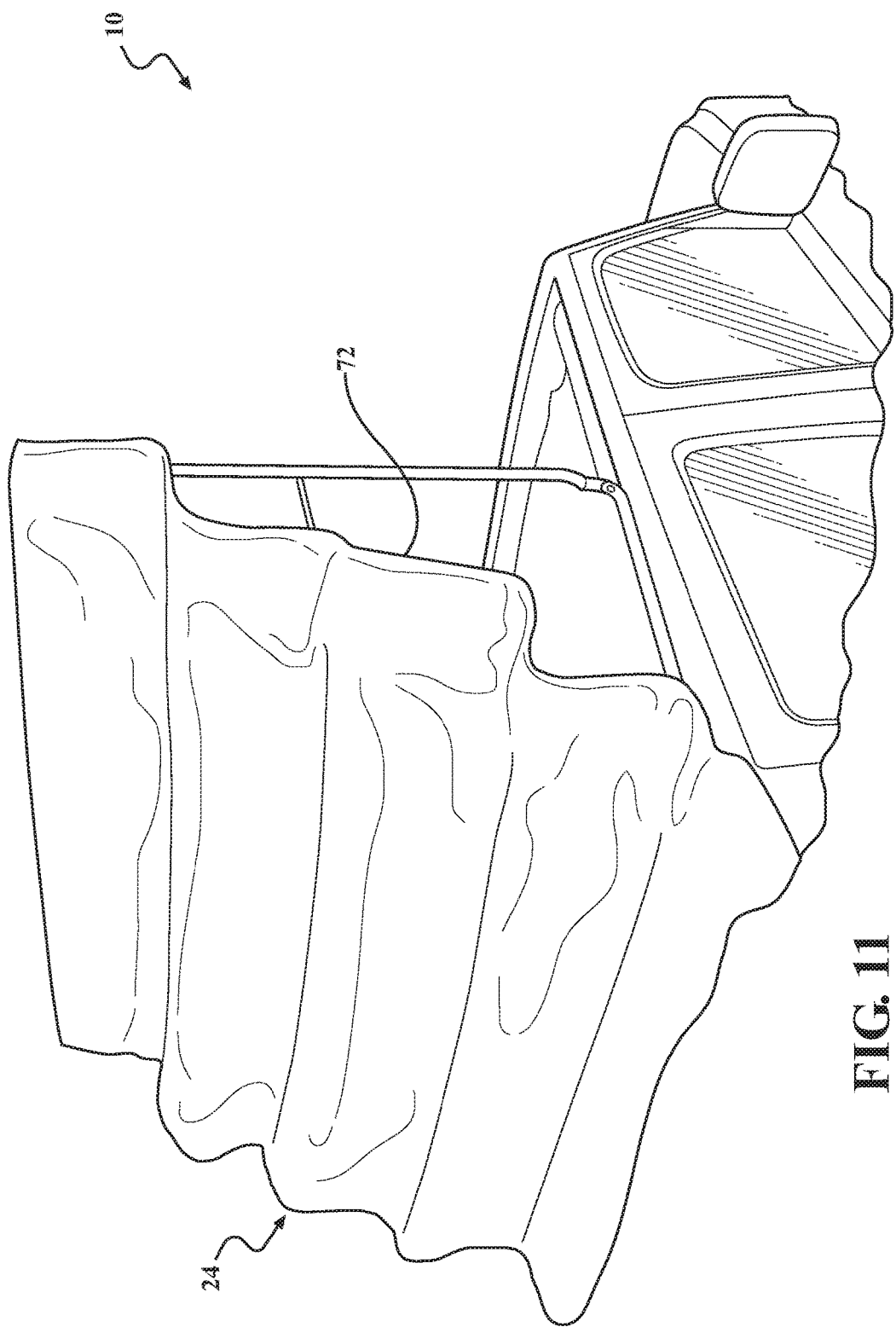

A soft top fabric 72 is listed or otherwise connected to at least the front bow member 44; the first fabric assist bow member 59; the intermediate bow member 50; the second fabric assist bow member 60; the first rear bow 67, and, the rear bow member 66, such that when the sunroof portion is raised the fabric 72 is managed and folded by the first and second fabric assist bows 59,60 and intermediate bow 50 in a folded accordion like manner such as show in FIG. 11. As the top is lifted up the first, second and intermediate bows 59, 60, 50 extend outward and provide folding of the top material managing the material and carrying the material in a manner away from the folding mechanisms of the top. Very little if any manual management by the operator is necessary when folding the pivotal sunroof portion 24 of the top.

The cover 72 is, by way of non-limiting example, connected to at least one of the first fabric assist bow member 59, the intermediate bow member 50, or the second fabric assist bow member 60, preferably to all three bows 59, 50 and 60, by a channel provided on each bow that receives a respective extrusion, each extrusion being operably connected to the cover, e.g., sewn, and slid into the respective channel(s). The channel(s) and extrusion(s) are shaped to prevent the extrusion from moving laterally out of the channel(s).

Referring to the figures generally, the left half of the assembly 10 and corresponding features are substantially mirror image/symmetrical to the right half of the assembly 10 and corresponding features depicted in the figures.

The lift assist locking mechanism is adaptable to any articulating soft top assembly where controlling the movement of the soft top between a sunroof position and at least one further opened position is desired.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A soft top assembly for a vehicle, comprising:
   a pair of frame members operably connected to the vehicle;
   a pair of side rails slidably connected to the frame members;
   a pivotal sunroof portion pivotally connected to the pair of side rails;
   a cover operably connected to at least the pivotal sunroof portion, wherein pivoting the pivotal sunroof portion moves the cover between a closed position and an open sunroof position;
   a lift assist locking mechanism operably connected to the vehicle and operably coupled to the pair of side rails to selectively allow the soft top assembly to move between the open sunroof position and a rearward open position;

wherein the lift assist locking mechanism comprises at least one cam that is rotatably mounted and at least one rotatable member that is rotatably mounted, wherein when the cam is in a first locking position the cam engages a protruding surface on the rotatable member to prevent the soft top assembly from moving to the rearward open position, and, when the cam is rotated to a second unlocking position the cam allows for the soft top assembly to move to the rearward open position.

2. The soft top assembly of claim 1, wherein the pivotal sunroof portion further comprises at least one fabric management arrangement operably coupled to the cover to manage and fold the cover when the pivotal sunroof portion is pivoted.

3. The soft top assembly of claim 2, wherein the fabric management arrangement further comprises a first fabric assist bow member articulatingly connected between a front bow and an intermediate bow member, wherein the first fabric assist bow member is operably connected to a first bow assist linkage that is pivotally connected to a pivot arm of the pivotal sunroof portion.

4. The soft top assembly of claim 3, further comprising a second bow assist linkage operably connected to the first fabric assist bow member, wherein the intermediate bow is operably connected to a first linkage arm pivotally connected to the pivot arm and operably connected to the second bow assist linkage.

5. The soft top assembly of claim 4, further comprising a second fabric assist bow member articulatingly connected between the intermediate bow member and a first rear bow member.

6. The soft top assembly of claim 1, further comprising a third pivotal fabric assist linkage pivotally connected to a second linkage arm pivotally connected to one of the side rails and a fourth fabric assist linkage operably pivotally connected to the side rail.

7. The soft top assembly of claim 6, further comprising a lift assist mechanism operably located between the fourth fabric assist linkage and the side rail, wherein the lift assist mechanism is operably connected to the side rail by way of lost motion arrangements comprising bushing members provided to slide in slots formed in the side rails.

8. The soft top assembly of claim 7, wherein the lift assist mechanism further comprises a first and second gas cylinder including respective first and second actuation shafts received in first and second cylinder bodies which are connected in force opposition between the fourth fabric assist linkage and the side rail such that one of the gas cylinders is compressed when the pivotal sunroof portion is in the closed position and the other of the gas cylinders is extended, wherein when the pivotal sunroof portion is opened to the open sunroof position the force in the compressed gas cylinder applies force to the fourth fabric assist linkage assisting the pivotal sunroof portion in an opening direction and the other cylinder is compressed, and upon closing the pivotal sunroof portion the now compressed cylinder provides force assistance for closing the pivotal sunroof portion, and wherein the first and second gas cylinders connected between respective bushing members provides lost motion during initial opening and closing actions of the pivotal sunroof portion.

9. The soft top assembly of claim 1, wherein the lift assist locking mechanism further comprises at least one release mechanism operably coupled to the at least one cam operable to cause the cam to rotate between the locked and unlocked positions.

10. The soft top assembly of claim 9, wherein the release mechanism includes at least one cable connected to an end of the cam and to a release handle, wherein operating the release handle causes the cable to move for rotating the cam to the unlocked position.

11. The soft top assembly of claim 9, wherein the release mechanism is located on a rear bow member that is operably connected to a first arm member, wherein the first arm member is rotatably connected to the lift assist locking mechanism and moves substantially downward when the soft top assembly is moved to the rearward open position.

12. The soft top assembly of claim 11, further comprising a second arm member operably coupled to the rotatable member and operably coupled to a first rear bow member, wherein when the cam is in the locked position the second arm member cannot rotate, and, wherein when the cam is in the unlocked position the second arm member is rotatable between an upward position and downward position to allow the soft top assembly to move to between the open sunroof position and rearward open position.

13. The soft top assembly of claim 1, wherein the lift assist locking mechanism includes at least one cam lockout that is rotatably connected and at least one handle lockout that is rotatably connected, said handle lockout having an elongated aperture operably sized to retain a guide pin of the cam lockout, wherein selectively rotating the handle lockout moves the aperture along the guide pin to position the cam lockout for preventing the soft top assembly from rotating back to the open sunroof position.

14. The soft top assembly of claim 13, wherein when the handle lockout and cam lockout are in the locked position, the soft top can be operably removed from the vehicle.

15. A soft top assembly for a sport utility vehicle, comprising:
   a pair of frame members operably connecting the soft top assembly to the vehicle, wherein the frame members include channels;
   a pair of side rails slidably connected within the channels;
   a pivotal sunroof portion including at least one pair of pivot arms;
   a cover operably connected to the pivotal sunroof portion, wherein pivoting the pivotal sunroof portion moves the cover between a closed position and an open sunroof position;
   a lift assist mechanism to assist pivotal movement of the pivotal sunroof portion between the closed position and open sunroof position;
   a lift assist locking mechanism to control movement of the soft top assembly between the open sunroof position and a downward open position.

16. The soft top assembly of claim 15, wherein the lift assist locking mechanism further comprises:
   at least one cam rotatable between a locked and unlocked position;
   at least one rotatable cam lockout;
   at least one rotatable handle lockout;
   at least one rotatable member abutting the cam at rest to hold the soft top assembly in the open sunroof position; and
   at least one release mechanism, wherein actuating the release mechanism causes the cam to rotate to the unlocked position out of engagement with the rotatable member to allow the soft top assembly to be rotated into the downward open position.

17. The soft top assembly of claim 16, wherein the release mechanism is a cable system operably coupled to the cam and operably connected to a release lever engaged by an operator for rotating the cam to the unlocked position.

18. The soft top assembly of claim 15, wherein the lift assist mechanism further comprises a first and second gas cylinder including respective first and second actuation shafts received in first and second cylinder bodies which are connected in force opposition between a linkage of the lift assist mechanism and the side rail such that one of the gas cylinders is compressed when the pivotal sunroof portion is in the closed position and the other of the gas cylinders is extended, wherein when the pivotal sunroof portion is opened to the open sunroof position the force in the compressed gas cylinder applies force to the linkage assisting the pivotal sunroof portion in an opening direction and the other cylinder is compressed, and upon closing the pivotal sunroof portion the now compressed cylinder provides force assistance for closing the pivotal sunroof portion.

19. A soft top assembly for a vehicle, comprising:
- a pair of side rails operably slidably connected to the vehicle;
- a pivotal sunroof portion pivotally connected to the pair of side rails and operably connected to a lift assist mechanism, said pivotal sunroof portion including at least a pair of pivot arms rotatably connected to the pair of side rails and at least one fabric management assist arrangement, wherein the lift assist mechanism includes a first and second gas cylinder which are connected in force opposition between a linkage of the lift assist mechanism and the side rails, by way of lost motion arrangements comprising bushing members provided to slide in slots formed in the side rails, such that one of the gas cylinders is compressed when the soft top assembly is in the closed position and the other of the gas cylinders is extended, wherein when the soft top assembly is opened to the open sunroof position the force in the compressed gas cylinder applies force to at least one linkage assisting the soft top assembly in an opening direction and the other cylinder is compressed, and upon closing the soft top assembly the now compressed cylinder provides force assistance for closing the pivotal sunroof portion;
- a lift assist locking mechanism including a release mechanism and including a housing with a rotatably connected cam and a rotatably connected rotatable member, said cam in abutting engagement with the rotatable member to keep the soft top assembly from moving from the open sunroof position to a downward open position, wherein pulling the release mechanism draws the cam out of engagement with the rotatable member to allow the soft top assembly to move from the open sunroof position to a downward open position.

* * * * *

UNITED STATES PATENT AND TRADEMARK OFFICE
CERTIFICATE OF CORRECTION

PATENT NO. : 10,166,848 B2
APPLICATION NO. : 15/354663
DATED : January 1, 2019
INVENTOR(S) : Stephen J. Lewis and Tavis Lutzka Page 1 of 1

It is certified that error appears in the above-identified patent and that said Letters Patent is hereby corrected as shown below:

In the Specification

Column 4,
Line 11, "84" should be -- 80 --

Column 7,
Line 2, please delete "(."

Signed and Sealed this
Fourteenth Day of April, 2020

Andrei Iancu
*Director of the United States Patent and Trademark Office*